Figure 1:
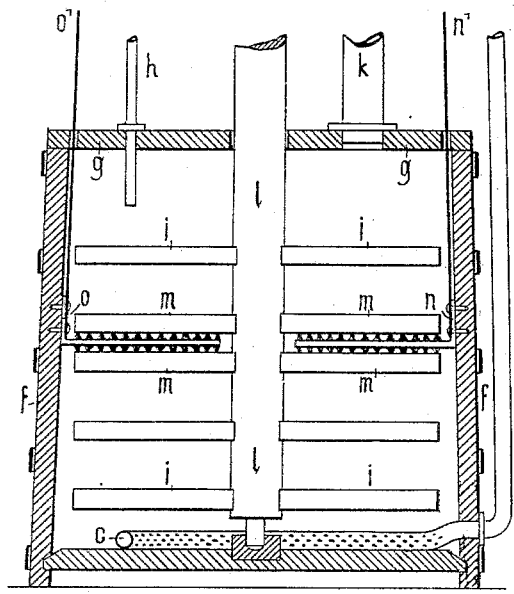

(No Model.)

W. MAJERT.
MANUFACTURE OF METHYLENE BLUE BY ELECTROLYSIS.

No. 323,514. Patented Aug. 4, 1885.

Witnesses:
Edward Stew.
Geo. L. Wheelock

Inventor
Wilhelm Majert,
By Knight Bros.
Atty

United States Patent Office.

WILHELM MAJERT, OF GRUNAU, NEAR BERLIN, GERMANY, ASSIGNOR OF TWO-THIRDS TO DR. ADOLPH EWER AND PAUL PICK, OF SAME PLACE.

MANUFACTURE OF METHYLENE-BLUE BY ELECTROLYSIS.

SPECIFICATION forming part of Letters Patent No. 323,514, dated August 4, 1885.

Application filed September 19, 1884. (No model.) Patented in Belgium August 1, 1884, No. 65,921.

*To all whom it may concern:*

Be it known that I, WILHELM MAJERT, a subject of the King of Prussia, and residing at Grunau, near Berlin, Prussia, Germany, have invented a new and useful Process for Obtaining Sulphurous Coloring-Matter by Electrolysis, (for which Letters Patent have been granted to me in Belgium, No. 65,921, August 1, 1884,) of which the following is a specification.

The subject of my invention is a new process for producing methylene-blue and other homologous coloring-matters containing sulphur from paramido derivatives of primary, secondary, and tertiary aromatic amines, and from the hydrazo compounds of tertiary aromatic amines; and the process substantially consists in dissolving the said materials in water, in acidulating the liquid, in introducing thereinto a sulphurous substance, which, under the action of an electric current in acidulated solution, separates out sulphur on the positive pole—such as sulphide of hydrogen—and in subjecting the liquid to electrolytic treatment.

If two plates of platinum, constituting the poles of an electric circuit, be immersed in a solution of paramido-dimethylaniline (being one of the tertiary aromatic amines) in dilute sulphuric acid, and which contains sulphide of hydrogen, a rapid evolution of hydrogen takes place on the negative pole, while the liquid around the positive pole assumes a blue color; but this color soon vanishes again, and the platinum plate of the positive pole becomes covered with a gray film. If this film is removed by means of a brush or otherwise, the blue color will be formed anew, but soon disappear again. If, however, the platinum plate be maintained bright by constant brushing, the sulphide of hydrogen will in a short time have become decomposed under continuous evolution of hydrogen at the negative pole, and the blue color which then sets in does not disappear again. When the liquid thus commences to become blue, it mainly contains the leuco compound of methylene-blue—*i. e.*, methylene-white—which has been formed by the electrolytic process from the paramido-dimethylaniline and the sulphide of hydrogen. By continued application of the current, after the sulphide of hydrogen has been wholly decomposed into sulphur and hydrogen, the said methylene-white is converted into methylene-blue. As the process progresses, the color of the liquid gradually becomes deeper, and when no further increase of intensity can be noticed the operation is finished, the chemical formula for paramido-dimethylaniline being $$C_6H_4 \begin{Bmatrix} NH_2 \\ N(CH_3)_2 \end{Bmatrix},$$

and that for sulphide of hydrogen $H_2S$. The reaction taking place under the aforesaid conditions may be shown by the following equation:

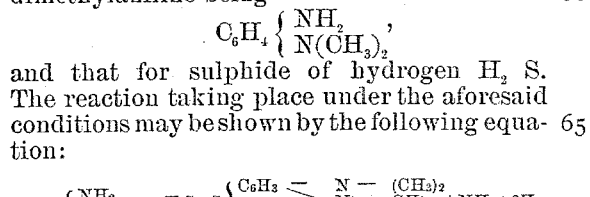

This equation shows that by the electric action the paramido-dimethyl-aniline is decomposed into hydrogen and a compound containing less hydrogen than the original substance, and the sulphide of hydrogen into its constituents, hydrogen and sulphur. The hydrogen thus set free escapes in gaseous state at the negative pole, and, while ammonia splits off, the said compound combines with the sulphur to form the desired coloring-matter. In like manner as that described other paramido derivatives of primary, secondary, and tertiary aromatic amines, and also the hydrazo compounds of the latter class of amines, may be treated for producing sulphurous colors, the chemical process being in all cases analogous to the one particularly set forth. The colors obtained from the different substances vary from violet to greenish blue. Those produced from paramido-diphenylamine and from the homologues thereof are insoluble in water.

Instead of sulphide of hydrogen, all other sulphurous compounds may be employed, which, when subjected in acid solution to the electric current, separate out sulphur on the positive pole—as, for instance, persulphide of hydrogen and sulpho-carbonic acid. Moreover, the sulphuric acid hereinbefore mentioned may be replaced by hydrochloric acid; but in this case protochloride of iron has to be added for absorbing and thereby rendering innocuous the chlorine and the chloric and perchloric acids originating from the hydrochloric acid, and which would otherwise decompose the methylene-white as well as the methylene-blue.

Figure 2:
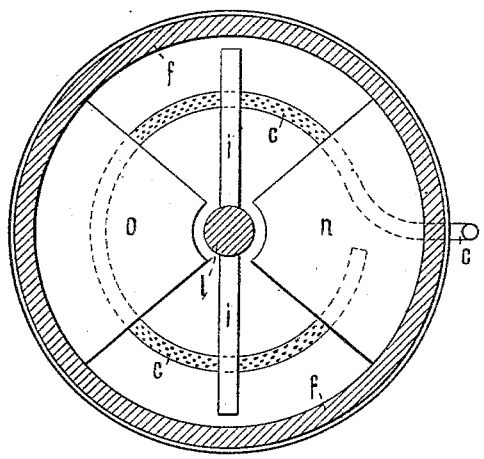
Figure 3:
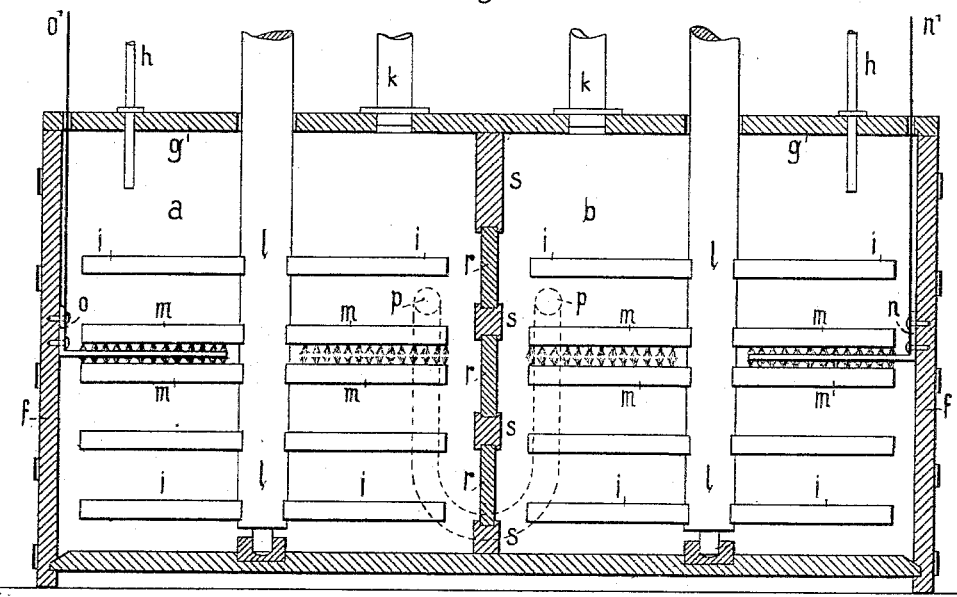

On the annexed sheet of drawings, Figures 1 and 2 represent, respectively, in vertical sectional view and in plan (with cover off) an apparatus for carrying out the process. Fig. 3 shows a modification thereof.

$f$ is a wooden vat, preferably coated with varnish and adapted to contain the substances to be treated. Within the same there is an insulated wooden shaft, $l$, having the arms $i$, for stirring the liquid, and the arms $m$, arranged in pairs, one above the other, and provided on their opposite faces with bristles, so as to form brushes for cleaning the electrodes. The latter consist in the platinized copper plates $n$ and $o$. These are fixed to the vat $f$, and extend from the walls thereof nearly to the shaft $l$, and they are placed in horizontal position at such a height as that, when the shaft $l$ rotates, the brushes on the arms $m$ will sweep off from both surfaces of the same all deposits that may form thereon. The said plates are connected by the conductors $o'$ and $n'$ to the two poles of a dynamo-machine. The currents produced by this machine may be of uniform or of alternating direction. The vat is closed by a cover, $g$, through which passes a pipe, $h$, for the introduction of the liquid materials. $k$ is a pipe for conducting away the gases evolved during the process, and $c$ a pipe for introducing air.

Supposing the substance to be decomposed be paramido-dimethylaniline, and that, for producing the requisite sulphide of hydrogen, sulphide of sodium be employed, the process is carried out by means of the described apparatus in the following manner: A solution of one part of the said substance in forty parts of water and four parts of sulphuric acid of 66° Baumé having been run into the vat, and the stirring apparatus as well as the dynamo-machine being in motion, the sulphide of sodium, dissolved in water, is added slowly and in such quantity that the liquid will become and remain as much as possible saturated with the sulphide of hydrogen generated, but that no considerable quantity of the latter will escape. From time to time the liquid is tested, and if it is found that it contains, besides the leuco compound of methylene-blue—i. e., methylene-white—but very little paramido-dimethylaniline, the supply of sulphide of sodium is stopped. The residual sulphide of hydrogen, which is now no more required, may be eliminated by electric decomposition; but I prefer to remove the same by passing a strong current of air through the liquid by means of the aforesaid pipe $c$. The liquid will then, under the continued action of the electric current, soon commence to become blue. When the intensity of the color does not increase any more, the electric current and the introduction of air are stopped. From the solution thus obtained the coloring substance or methylene-blue is precipitated in known manner by chloride of zinc and chloride of sodium.

Instead of the platinized plates of copper, electrodes made of other suitable substances—such as silver, lead, or carbon—may be used.

The apparatus shown by Fig. 3 consists of a receptacle divided into two chambers, $a$ and $b$, by means of a wall made of materials through which a contact of the liquids with each other can take place—such as unglazed earthenware, wood, or parchment-paper. In the drawings the wall is supposed to be made of earthenware plates $r$, fitted into the wooden frame-work $s$. Both chambers are provided with a stirring and brushing apparatus alike to the one described; but in either chamber there is one electrode only. This apparatus is designed not only for obtaining methylene-blue, but also for producing from nitroso-dimethylaniline the paramido-dimethylaniline required for generating the former. The procedure for this purpose is as follows:

The chamber $a$ is filled with a solution of paramido-dimethylaniline, and the chamber $b$ with a solution of nitroso-dimethylaniline, both solutions being prepared with diluted sulphuric acid. Into the chamber $a$ an aqueous solution of sulphide of sodium is then allowed to flow, while the stirring apparatus and the dynamo-machine are put in action, the current from the latter being so directed that the plate $o$ of the chamber $a$ will be the positive electrode and the plate $n$ of the chamber $b$ the negative electrode. Under these conditions methylene-blue will be formed in the chamber $a$, while the nitroso-dimethylaniline contained in $b$ is converted into paramido-dimethylaniline. Thereupon chamber $a$ is filled with solution of nitroso-dimethylaniline and the process repeated with inverted electric current, so that $n$ is now the positive and $o$ the negative electrode. The paramido-dimethylaniline produced during the first process then serves for the formation of methylene-blue, while the new portion of nitroso-dimethylaniline in $a$ is again converted into paramido-dimethylaniline, to serve in a third operation, and so on.

Instead of using porous plates and the like for allowing the liquids in the two chambers to come in contact with each other without mixing, a communication may be established between the chambers by a bent pipe, such as the pipe $p$. (Shown in dotted lines in Fig. 3.) Through this pipe the electric current will pass from one liquid to the other without any appreciable amount of mixing of the liquids taking place.

I am aware that aromatic amines and some of the hydrazo derivatives thereof have heretofore already been subjected for certain purposes to electrolysis; but this in no wise prejudices the novelty of my invention, as the same does not consist, broadly, in an electric treatment of aromatic amines or of the paramido derivatives, or the hydrazo compounds thereof, for the reason that these substances by themselves and without the coaction of sulphide of hydrogen (or its equivalents) do not yield the coloring-matters to be obtained by my process; but

What I claim as my invention is—

The process of producing methylene-blue and other homologous colors containing sulphur from paramido derivatives of primary, secondary, and tertiary amines, and from the hydrazo compounds of the latter, by electrolysis in acidulated solution and in the presence of such sulphurous substances as, under the action of the electric current, separate out sulphur on the positive pole, substantially as hereinbefore described.

In testimony that I claim this as my own I have signed hereunto my name in the presence of two subscribing witnesses.

WILH. MAJERT.

Witnesses:
B. ROI,
PH. V. HERTLING.